United States Patent [19]

Shaw

[11] E Patent Number: Re. 32,877

[45] Reissued Date of Patent: Feb. 21, 1989

[54] STRUCTURE FOR AND METHOD OF REPRODUCTION

[76] Inventor: Daniel L. Shaw, 20119 Violand, Roseville, Mich. 48066

[21] Appl. No.: 557,522

[22] Filed: Dec. 1, 1983

Related U.S. Patent Documents

Reissue of:

[64] Patent No.: 3,039,361
Issued: Dec. 1, 1981
Appl. No.: 972,986
Filed: Dec. 26, 1978

[51] Int. Cl.[4] ..... H04N 1/46

[52] U.S. Cl. ..... 358/77; 358/75; 358/287

[58] Field of Search ..... 358/75, 77, 78, 256, 358/287, 284, 293, 294, 213; 346/75

[56] References Cited

U.S. PATENT DOCUMENTS

| | | | |
|---|---|---|---|
| 2,951,894 | 9/1960 | Hirsch | 358/75 |
| 3,318,996 | 5/1967 | Garfield et al. | 358/294 |
| 3,404,221 | 10/1968 | Loughren | 358/75 |
| 3,526,704 | 9/1970 | Heller, Jr. | 358/75 |
| 3,553,371 | 1/1971 | Suenaga | 358/77 |
| 3,560,988 | 2/1971 | Krick | 346/75 |
| 3,821,732 | 6/1974 | Romney | 358/293 |
| 3,830,972 | 8/1974 | Siverling | 358/213 |
| 3,867,569 | 2/1975 | Watson | 358/213 |
| 4,127,870 | 11/1978 | Colditz | 358/78 |
| 4,150,401 | 4/1979 | Yamamoto et al. | 358/284 |

*Primary Examiner*—Michael A. Masinick
*Attorney, Agent, or Firm*—Dale R. Small & Associates

[57] ABSTRACT

Structure for reproducing a copy from an original by driving an original past a light source and light sensors to develop signals in the sensors representative of intelligence on the original which it is desired to copy, driving a copy member past printers in synchronization with the driving of the original and actuating the printers in accordance with the signals sensed by the sensors. The sensors and printers are modular. Amplifiers may be provided between the sensors and the printers, and signals from the sensors may be stored prior to printing in response thereto. The reproduction may be different in size than the original and/or in color.

27 Claims, 2 Drawing Sheets

FIG.2
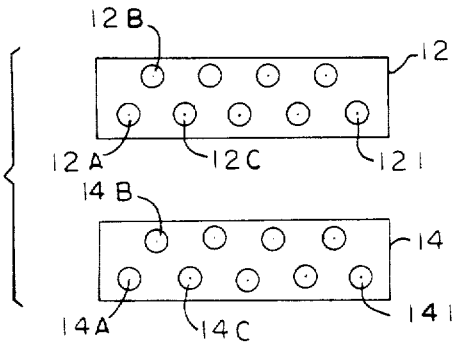
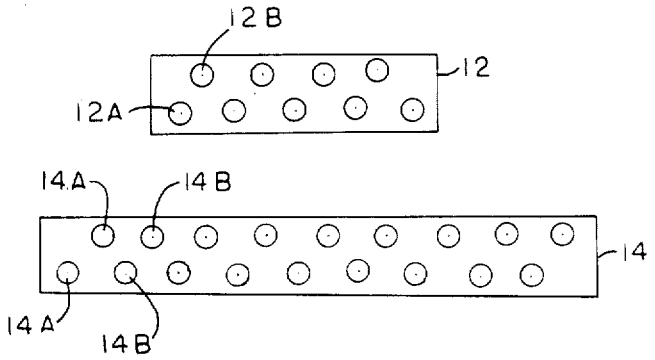
FIG.3
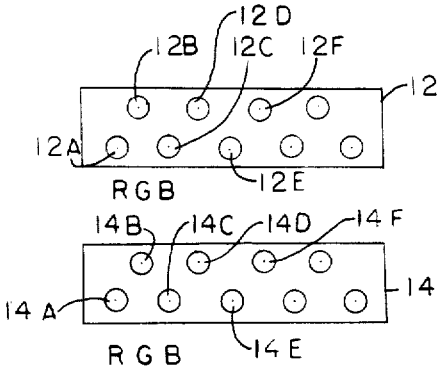
FIG.4
FIG.5
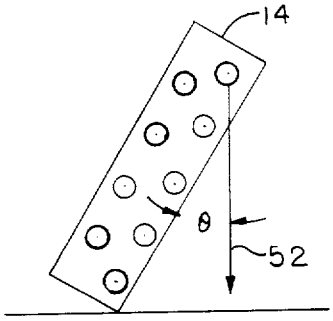
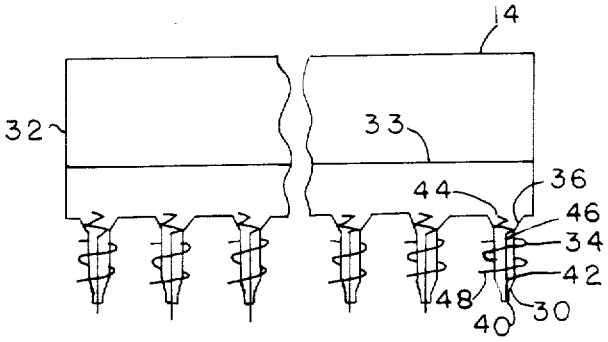
FIG.6

STRUCTURE FOR AND METHOD OF REPRODUCTION

Matter enclosed in heavy brackets [ ] appears in the original patent but forms no part of this reissue specification; matter printed in italics indicates the additions made by reissue.

The invention relates to reproduction of original drawings or the like in enlarged form and color if desired with particularly simple, econimical and efficient modular structure.

BACKGROUND AND SUMMARY OF THE INVENTION

In the past, reproduction of original drawings or the like has been accomplished by the use of equipment such as diazo and ozalid equipment. Also, office equipment copiers such as the well known Xerox and IBM copy machines have been utilized to produce copies.

The prior equipment has been deficient in that it is extremely expensive, often complicated and inefficient in use. Further, the equipment of the past has often lacked the ability to provide enlarged copies and has often been incapable of either sensing colored portions of originals and/or printing copies in different colors. Prior equipment has also often suffered from distortion of the copy with regard to the original. Breakdowns such as paper jams, faulty circuits and the like have also been common in prior reproduction equipment.

The reproduction structure and method of the invention includes a light source and a plurality of sensors, means for driving an original to be copied past the light source in a manner to vary the light passed to the sensors in accordance with intelligence on the original which it is desired to copy, a plurality of printers connected to the sensors to print the intelligence sensed by the sensors on copy material passed by the printers and drive means for synchronizing the drive of the original and the copy.

Amplifiers may be provided between the sensors and printers to amplify the signal from the sensors for actuating the printers. Storage structure may also be provided between the sensors and printers for selectively storing the signal from the sensors for actuating the printers at a later time. The sensors and printers are modular in accordance with the invention so that substantially any width original may be reproduced. The copy may be an enlargement or a reduction of the original. Further, both the original and the copy may be in color.

BRIEF DESCRIPTION OF DRAWINGS

FIG. 2 is a diagrammatic representation of a module of the sensors and printers structure for sensing and printing a copy of an original in a single color.

FIG. 3 is a diagrammatic representation of a module of sensors and printers structure for sensing an original and printing a copy of the original twice the size of the original.

FIG. 4 is a diagrammatic representation of a module of the sensors and printers structure for sensing a color original and printing a copy in color.

FIG. 5 is a diagrammatic representation of a printer positioned at an angle to the direction of a copy being printed thereby, whereby substantially any definition possible with modern printing heads may be accomplished in the reproduction structure of FIG. 1 by the method of the invention.

FIG. 6 is a diagrammatic representation of one proposed printer head structure.

DETAILED DESCRIPTION

Figure 1:
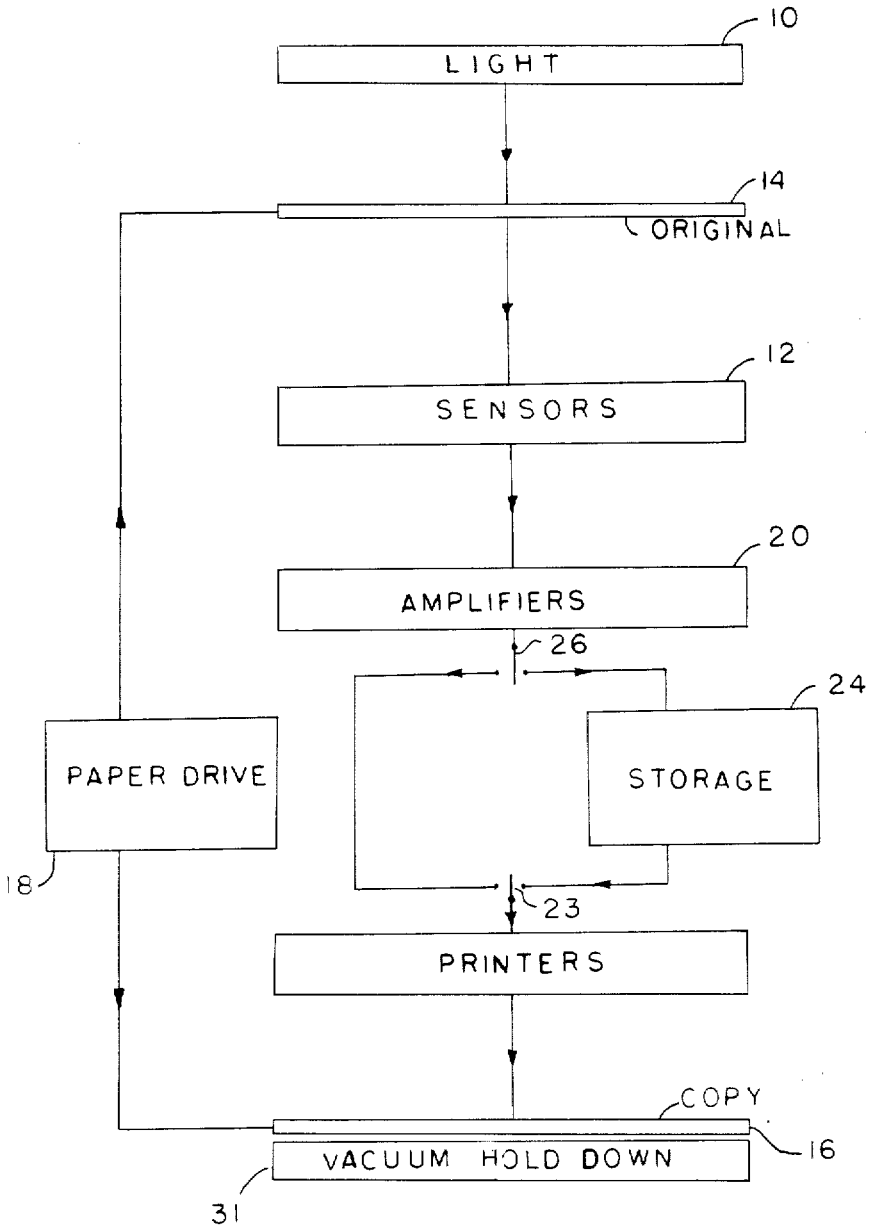
FIG. 1 is a block diagram of reproduction structure constructed in accordance with the invention for effecting the reproduction method of the invention.

As shown in FIG. 1, the reproduction structure in accordance with the invention comprises a light source 10, sensors 12 for sensing light passed through a translucent original 14 and developing a single proportional to the light sensed thereby. The structure of the invention as shown in FIG. 1 further includes printers 14 for printing in response to signals from the sensors 12 on copy material 16 to reproduce a copy of intelligence on the original. The original 14 and copy 16 are driven in synchronism by the paper drive structure 18.

Amplifiers 20 may be provided between the sensors 12 and printers 14 for amplifying the signals sensed by the sensors. The amplified signals are then used to actuate the printers 14.

Storage structure 24 may be provided between the sensors 12 and the printers 14 so that signals from the sensors 12 may be stored in the storage structure 24 prior to being used to actuate the printers 14. The switches 26 and 28 are utilized to selectively pass the signal from the sensors 12 to the printers 14 directly through the amplifiers 20, or alternatively to place the signals from the sensors 12 in the storage structure 24 for subsequent use in actuating the printers 14.

Vacuum hold down structure 31 is provided for the copy material 16 as shown.

More particularly, the light source 10 may be a plurality of separate light sources for directing light through a translucent original 14 such as a drawing having lines thereon which are opaque to individual light sensitive sensors of the sensors 12. Alternatively, the light source 10 may be a single light source for energizing the sensors either directly through the original 14 or with reflected light from the original 14. The light source 10, whether it be a multiple light source or a single light source, may be a light source emitting only a predetermined light color for sentizing correspondingly limited sensors.

The original 14 may be for example a sheet of tracing paper having dark pencil or ink lines thereon, which it is desired to copy. Such originals may be in a plurality of sizes as, for example, 12×18, 18×24, 24×36 or 30×42 inches. The intelligence on the original 14 may be in the nature of lines as in technical drawings or may be pictures, diagrams or the like.

Sensors 12 may be a plurality of individual light sensitive elements such as photoelectric cells operable to produce an electrical signal proportional to light impinging thereon. As related above, the sensors may be sensitive to a particular light color or only to the quantity of light.

Amplifiers 20 may be a plurality of the usual electrical amplifiers for amplifying the electrical signals produced by the individual sensors 12. It is contemplated that there will be as many amplifiers as there are sensors, although in some modifications of the invention this may not be essential.

Printers 14 may be any of a number of known printers for providing an ink flow in response to an electrical signal. It is anticipated that the printers will be multiple head printers.

As shown best in FIG. 6, one embodiment of the printers 14 includes a plurality of separate heads 30 secured to an ink reservoir 32. The heads 30 each include an outer cylindrical body 34 having an opening 36 in one end thereof in communication with ink 38 in reservoir 32 and having a printing opening 40 in the other end thereof through which ink is dispensed onto the copy material 16. The printing heads 30 further include a needle-like armature 42 therein and spring means 44 acting on the end 46 of armature 42 to urge the other end of the armature 42 into the ink dispensing opening 40.

In operation of a single printing head 30, on actuation of a solenoid coil 48 associated therewith the armature 42 is caused to rise in the cylindrical body 34 of the head 30 against the resilient force of the biasing means 44 to dispense ink from the reservoir 32 which may be pressurized, if desired.

On de-energizing of the solenoid 48, the armature 42 again extends into the printing opening 40 of the printing head 30 which assures that the opening 40 is always clear on actuation of the solenoid 48.

The storage unit 24 may be any of a plurality of known storage units such as a magnetic tape storage unit capable of storing a plurality of individual signals received from the amplifiers 20 and later reproducing the individual signals as they are received for actuation of the printers 14.

The switches 26 and 28 as shown in FIG. 1 are single pole double throw switches. With the switches 26 and 28 in their left position, signals from the sensors 12 are directed through the amplifiers directly to the printers 14. With the switch 26 in the right position, the signals from the sensors are stored in the storage unit 24. Subsequently, with the switch 28 in the right position, the signals from the storage structure 24 are passed to the printers 14.

It will be understood that multiple connections are provided between the sensors 12, amplifiers 20 and printers 14. Thus, a storage unit 24 capable of storing simultaneously received signals and reproducing such signals simultaneously is required along with multiple switches 26 and 28.

Paper drive 18 may again be any of a plurality of known paper drive mechanisms which will synchronize the movement of the original 14 which it is desired to copy with the drive of the copy 16 on which it is desired to reproduce a copy of the original 14. Such drives are currently known and may take the form of belt drives or chain and sprocket drives.

Copy material 16 may be plain bond paper or any other flat medium capable of receiving ink from the printers 14. Copy material 16 may be any desired color.

Vacuum hold down structure 31 is provided in conjunction with the copy to insure flatness of the copy material 16 as it is passes beneath the printers 14. The hold down structures 31 may be of any desired type capable of holding the copy material 16 in a flat condition to enhance the printing.

In operation, when it is desired to reproduce a copy of an original drawing 14 for example, the drawing 14 is moved between the light source 10 and sensors 12. The sensors 12 sense the light through the original 14 in accordance with the intelligence on the original 14; that is, for example, in accordance with the ink lines on translucent tracing paper.

The electrical signals generated in the sensors as a result of the light impinging thereon are amplified in amplifiers 20 and are either sent directly to the printers 14 with the switches 26 and 28 in the left position as shown in FIG. 1 or the amplified signals from the sensors 12 are placed in the storage structure 24 with the switch 26 in the right position. Subsequently, with the switch 26 in the right position, the signals from the storage structure 24 are passed to the printers to actuate the printers. In either case, the printers reproduce a copy of the intelligence from the original on the copy which is held in position by the vacuum hold down structure 31.

During such reproduction of the original, the original and copy are driven at the same speed between the light source 10 and sensors 12 and beneath the printers 14, respectively.

As shown best in FIG. 2, it will be understood that the sensors 12 and the printers 14 include multiple single sensor and printer units which are indicated 12a through 12i and 14a through 14i in FIG. 2. The signal from sensor 12a will actuate the printer 14a, the signal from sensor 12b will actuate the printer 14b, and so on. In operation, then, the sensor 12a causes printing with printer 14a on a very narrow line on copy 16 corresponding to a very narrow line on the original 14 to reproduce the intelligence on the very narrow line on the original 14 on the copy 16 as the original moves in the direction of arrow 50 in FIG. 2 which corresponds to movement out of the drawing and between the light source 10 and the sensors 12 in FIG. 1.

A single modular unit of light and sensors 12 and printers 14 is illustrated in FIG. 2. It will be understood that as many modular units as necessary may be placed side by side to provide any copying width desired.

Further as shown best in FIG. 5, if the sensor structure and/or printer structure that it is desired to use is such that the mere staggering of the individual sensors 12a–i and printers 14a–i as shown in FIG. 2 is not sufficient to give the desired resolution to the finished copy, the entire module may be placed at an angle $\theta$ with regard to the direction 52 of paper travel as shown in FIG. 5, whereby substantially any number of sensors and/or printers such as, for example, 70 per inch, may be placed in any given dimension transversely of the direction of movement of the original and copy to increase the resolution of the copy to the point where only the printing heads will limit the resolution of the copy.

If it is desired to enlarge the copy 16 as compared to the original 14 as shown in FIG. 3, a single sensing member, that is, 12a can be connected to control two adjacent printing heads 14a, while the sensor 12b can control the next two adjacent printing heads 14b, and so on. At the same time, the paper drive structure 18 must be varied to feed the copy paper 16 at twice the speed of the original through the reproduction structure of the invention. Similarly, a reproduction three times the size of the original, ten times the size of the original, and so on, may be accomplished.

A reduction of the original may be accomplished, if desired, through placing the printers 14 at an angle as shown in FIG. 5 and reducing the speed of travel of the copy paper through the reproduction structure of the invention.

Further, as shown in FIG. 4, color reproduction may be accomplished with the reproduction structure of the invention. Thus, as shown in the sensor and printer modules 12 and 14, with the first sensor 12a sensitive to red, the second sensor 12b sensitive to green, and the third sensor 12c sensitive to blue, the printers 14a, 14b and 14c are caused to be actuated only when the respective colors red, green and blue are sensed on the original 14. Individual printers 14 must in such system be connected to separate reservoirs of colored ink. Also, the color sequence must be repeated throughout the module. That is, the next three separate sensors, that is, 12d, 12e and 12f, would then be respectively sensitive to the colors red, green and blue and the next printers 14d, 14e and 14f would then be connected to red, green and blue ink reservoirs.

Further, multiple printing may be accomplished by the system indicated, whereby different shades and tones of the same colors and other colors combined from basic colors may be produced on a second printing of a same copy of a single original. Synchronization for the second printing may be done either mechanically or electrically in accordance with current technology.

Thus, in accordance with the invention, there is provided a reproduction structure and method which uses no drum or lens and therefore is substantially distortion free. Further, the structure of the invention requires no warm-up time and therefore provides a time saving.

While one embodiment of the present invention has been considered in detail, it will be understood that other embodiments and modifications thereof are contemplated. For example, color reproduction from a black and white original by connecting individual printers to separate ink reservoirs is contemplated. It is the intention to include all embodiments and modifications as are defined by the appended claims within the scope of the invention.

I claim:

1. A reproduction structure for making a two dimensional color copy of a two dimensional color original in a single passage of the original past a light source, comprising a light source directed onto the original as the original is driven past the light source, a plurality of sensors for sensing light from the light source modulated by the original and directed thereto and developing signals representative of intelligence on the original which it is desired to reproduce on copy material, amplifiers connected to the sensors for amplifying the signals, a plurality of printers responsive to the signals developed by the sensors for printing a two dimensional copy of the original in accordance with the sensor signals received by the printers on copy material driven by the printers in a single passage in synchronism with the drive of the original, said printers including individual printing heads in communication with a reservoir of ink, each of which printing heads includes a cylindrical body open to the ink reservoir at one end and having a printing opening at the other end thereof, a printing armature extending axially of the cylindrical body, means for resiliently holding the printing armature within the printing opening in the other end of the cylindrical body to prevent ink from exiting therethrough, and solenoid means operably associated with the armature for moving the armature out of the printing opening on energizing of the solenoid to permit passage of ink from the reservoir therethrough, means for variably synchronously driving the original and the copy past the light source and printers, means connected to the sensors and printers for controlling a plurality of printers from a single sensor, storage means between the sensors and printers and means for selectively passing a signal from the sensors directly and through storage in a delayed time frame to the printers, said sensors and printers being positioned obliquely to the direction of travel of the original and copy and a vacuum hold down structure for the copy material.

2. The method of printing a two dimensional color copy from a two dimensional color original in a single passage of the original past a light source comprising moving an original with regard to a light source and a plurality of light sensors in a single passage to develop in the plurality of light sensors signals proportional to intelligence on the original which it is desired to copy, storing the signal from the sensors for a period of time before printing a copy in accordance therewith, subsequently variably driving copy paper with respect to the original in a single passage past printers in synchronism with the movement of the original and causing a plurality of printers to print on the copy paper in accordance with the signals generated in each of the sensors.

3. Reproduction structure for making a two dimensional copy of a two dimensional original in a single passage of the original past a light source comprising a light source directed onto the original as the original is driven past the light source, a plurality of sensors for sensing light from the light source modulated by the original and directed thereto and developing signals representative of transversely adjacent intelligence on the original which it is desired to produce on copy material, and a plurality of printers responsive to the signals developed by the sensors for printing a two dimensional copy of the original in accordance with the sensor signals received by the printers on copy material driven by the printers in a single passage in synchronism with the drive of the original, wherein a single sensor controls a whole number multiple of printers *wherein the whole number is greater than one.*

4. Structure as set forth in claim 3, and further including storage means between the sensors and printers and means for selectively passing a signal from the sensors to the printer directly and through storage in a delayed time frame.

5. Structure as set forth in claim 3, and further including a vacuum hold down structure for the copy material.

6. Structure as set forth in claim 3, wherein the original may be in color and the printing is in color.

7. Structure as set forth in claim 3, wherein the sensors and printers are positioned obliquely to the direction of travel of the original and copy.

8. Structure as set forth in claim 3, wherein the printers include individual printing heads in communication with a reservoir of ink, each of which printing heads includes a cylindrical body open to the ink reservoir at one end and having a printing opening at the other end thereof, a printing armature extending axially of the cylindrical body, means for resiliently holding the printing armature within the printing opening in the other end of the cylindrical body to prevent ink from exiting therethrough, and solenoid means operably associated with the armature for moving the armature out of the printing opening on energizing of the solenoid to permit passage of ink from the reservoir therethrough.

9. The method of printing a two dimensional copy from a two dimensional original in a single passage of the original past a light source comprising moving an original with respect to a light source and a plurality of light sensors in a single passage to develop in the plurality of light sensors signals proportional to intelligence on the original which it is desired to copy, moving copy paper in a single passage past printers in synchronization with the movement of the original and causing the printers to print on the copy paper in accordance with the signals generated in the sensors, wherein a single sensor controls a whole number multiple of printers *wherein the whole number is greater than one.*

10. The method as set forth in claim 9, and further including sensing colors on the original and printing colors on the copy.

11. The method as set forth in claim 9, and further including storing the signal from the sensors for a period of time before printing the copy in accordance therewith.

*12. The method as set forth in claim 9 and further including the step of positioning at least one of the sensors and printers obliquely to the direction of travel of the original and copy.*

*13. The method of printing a two dimensional copy from a two dimensional original in a single passage of the original past a light source comprising moving an original in only one of the two dimensions with regard to a light source and a plurality of light sensors in a single passage of the original with regard to the light source and light sensors to develop in the plurality of light sensors signals proportional to, two dimensional intelligence on the original which it is desired to copy, subsequently variably driving copy paper with respect to the original in only one of the two dimensions in a single passage past printers in synchronism with the movement of the original and causing a plurality of printers to print on the copy paper in accordance with the signals generated in each of the sensors.*

*14. The method of printing a two dimensional color copy from a two dimensional color original in a single passage of the original past a light source comprising moving an original in only one of the two dimensions with regard to a light source and a plurality of light sensors in a single passage of the original with regard to the light source and light sensors to develop in the plurality of light sensors signals proportional to two dimensional intelligence on the original which it is desired to copy, storing the signals from the sensors for a period of time before printing a copy in accordance therewith subsequently variably driving copy paper with respect to the original in only one of the two dimensions in a single passage past printers and causing a plurality of printers to print on the copy paper in accordance with the signals generated in each of the sensors.*

*15. Reproduction structure for making a two dimensional copy of a two dimensional original in a single passage of the original in only one of the two dimensions past a light source comprising a light source directed onto the original, means for driving the original in only one of the two dimensions past the light source, sensors means for sensing light from the light source modulated by the original and directed thereto and developing signals representative to transversely adjacent intelligence on the original which it is desired to produce on copy material and additional means responsive to the signals developed by the sensor means for producing a two dimensional copy of the original in accordance with the sensor signals received by the additional means on copy material driven by the additional means in a single passage in only one of the two dimensions wherein at least one of the sensor means and additional means are positioned obliquely to the direction of travel of the original and copy.*

*16. Structure as set forth in claim 15, and further including storage means between the sensor means and additional means and means for selectively passing a signal from the sensor means to the additional means directly and through the storage means in a delayed time frame.*

*17. Structure as set forth in claim 15, wherein the original is in color and the copy is in color.*

*18. Reproduction structure for making a two-dimensional copy of a two-dimensional original in a single passage of the original past a light source comprising a light source directed onto the original as the original is driven past the light source, a plurality of sensors for sensing light from the light source modulated by the original and directed thereto and developing signals representative of transversely adjacent intelligence on the original which it is desired to produce on copy material, and a plurality of printers responsive to the signals developed by the sensors for printing a two-dimensional copy of the original in accordance with the sensor signals received by the printers on copy material driven by the printers in a single passage in synchronism with the drive of the original, wherein a signal sensor controls a whole multiple of printers and the sensors and the printers are positioned obliquely to the direction of travel of the original and copy.*

*19. Reproduction structure for making a two-dimensional of a two-dimensional original in a single passage of the original past a light source comprising a light source directed onto the original as the original is driven past the light source, a plurality of sensors for sensing light from the light source modulated by the original and directed thereto and developing signals representative of transversely adjacent intelligence on the original which it is desired to produce on copy material, and a plurality of printers responsive to the signals developed by the sensors for printing a two-dimensional copy of the original in accordance with the sensor signald received by the printers on copy material driven by the printers in a single passage in synchronism with the drive of thr original, wherein a single sensor controls a whole number multiple of printers and the printers include individual printing heads in communication with a reservoir of ink, each of which printing heads includes a cylindrical body open to the ink reservoir at one end and having a printing opening at the other end thereof, a printing armature extending axially of the cylindrical body, means for resiliently holding the printing armature within the printing opening in the other end of the cylindrical body to prevent ink from exiting therethrough, and solenoid means operably associated with the armature for moving the armature out of the printing opening on energizing of the solenoid to permit passage of ink from the reservoir therethrough.*

*20. Reproduction structure for making a two-dimensional copy of a two-dimensional original in a single passage of the original past a light source comprising a light source directed onto the original as the original is driven past the light source, a plurality of sensors for sensing light from the light source modulated by the original and directed thereto and developing signals representative of transversely adjacent intelligence on the original which it is desired to produce on copy material, and a plurality of reproduction means responsive to the signals developed by the sensors for reproducing a two-dimensional copy of the original in accordance with the sensor signals received by the reproduction means on copy material driven by the reproduction means in a signal passage in synchronism with the drive of the original, wherein a single sensor controls a whole number multiple of reproduction means.*

*21. Structure as set forth in claim 20, wherein at least one of the sensors and reproduction means are positioned obliquely to the direction of travel of the original and copy.*

*22. Structure as set forth in claim 20, wherein at least one of the sensors and reproduction means are modular to permit copying of substantially any width original.*

*23. Structure as set forth in claim 20, wherein the sensors are stationary.*

*24. The method of printing a two-dimensional copy from a two-dimensional original in a single passage of the original past a light source comprising moving an original with respect to a light source and a plurality of light sensors in a single passage to develop in the plurality of light sensors signals proportional to the intelligence on the original which it is desired to copy, moving copy paper in a single passage past reproduction means in synchronization with the movement of the original and causing the reproduction means to print on the copy paper in accordance with the signals generated in the sensors, wherein a single sensor controls a whole number multiple of reproduction means.*

*25. The method as set forth in claim 24, and further including positioning at least one of the sensors and reproduction means obliquely to the direction of travel of the original and copy.*

*26. The method as set forth in claim 24, and further including providing at least one of the sensors and reproduction means in modular form to permit copying of substantially any width original.*

*27. The method as set forth in claim 24, and further including making the sensors stationary.*

* * * * *